United States Patent [19]

Baron

[11] 4,328,322
[45] May 4, 1982

[54] SYNTHETIC POLYMERS BY POLYISOCYANATE POLYADDITION PROCESS

[75] Inventor: Richard C. Baron, Tewksbury, Mass.

[73] Assignee: Polaroid Corporation, Cambridge, Mass.

[21] Appl. No.: 189,149

[22] Filed: Sep. 22, 1980

Related U.S. Application Data

[63] Continuation-in-part of Ser. No. 99,857, Dec. 3, 1979, abandoned.

[51] Int. Cl.³ .............................................. C08G 18/32
[52] U.S. Cl. ...................................... 521/163; 528/68
[58] Field of Search .......................... 521/163; 528/68

[56] References Cited

U.S. PATENT DOCUMENTS

| | | | |
|---|---|---|---|
| 2,888,439 | 5/1959 | Simons | 528/59 |
| 3,256,213 | 6/1966 | Gmitter et al. | 521/112 |
| 3,426,097 | 2/1969 | Ilkka et al. | 525/512 |
| 3,808,250 | 4/1974 | Blahak et al. | 260/455 R |
| 3,817,940 | 6/1974 | Blahak et al. | 528/68 |
| 3,929,863 | 12/1975 | Blahak et al. | 560/50 |
| 3,932,360 | 1/1976 | Cerankowski et al. | 528/64 |
| 3,968,085 | 7/1976 | Rabilloud et al. | 525/184 |
| 3,975,428 | 8/1976 | Blahak et al. | 560/49 |
| 4,129,741 | 12/1978 | Schmidt et al. | 560/50 |
| 4,153,801 | 5/1979 | Schmidt et al. | 548/312 |
| 4,169,206 | 9/1979 | Mazanek et al. | 560/50 |
| 4,174,455 | 11/1979 | Habermeier et al. | 560/49 |
| 4,180,644 | 12/1979 | Marquis et al. | 528/68 |
| 4,186,257 | 1/1980 | Blahak et al. | 521/159 |

FOREIGN PATENT DOCUMENTS

| | | |
|---|---|---|
| 1182377 | 2/1970 | United Kingdom . |
| 1243238 | 8/1971 | United Kingdom . |
| 2009764 | 6/1979 | United Kingdom . |

OTHER PUBLICATIONS

Makromol. Chem. 179, pp. 1855–1859 (1978).

*Primary Examiner*—Maurice J. Welsh
*Attorney, Agent, or Firm*—Louis G. Xiarhos

[57] ABSTRACT

Synthetic polymers and a process for their preparation by a polyisocyanate polyaddition reaction are described. Synthetic polymers are provided by the reaction of a polyisocyanate with substantially an equivalent amount of an oligomeric para-, meta- or di-meta-aminobenzoic acid ester or amide having the formula

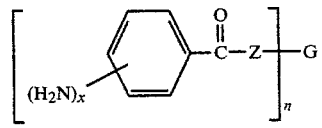

wherein n is an integer of from 2 to 4; each x is one or two; each benzoyl nucleus is para-, meta- or di-meta-amino-substituted; each Z is

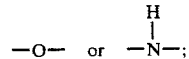

and G is an n-valent radical which may be obtained by the removal of hydroxyl or amino groups from an n-valent oligomeric polyol or polyamine having a molecular weight of from about 400 to about 6,000. Useful synthetic polymeric products can be simply and effectively provided by reaction of the polyisocyanate and the oligomeric aminobenzoic acid ester or amide reactants without the requirement of additional curative or chain-extending agents.

72 Claims, No Drawings

SYNTHETIC POLYMERS BY POLYISOCYANATE POLYADDITION PROCESS

REFERENCE TO RELATED APPLICATION

This application is a continuation-in-part of my earlier filed and copending application Ser. No. 099,857, filed Dec. 3, 1979 and now abandoned.

BACKGROUND OF THE INVENTION

This invention relates to synthetic polymers and to methods for their preparation by an isocyanate polyaddition process. More particularly, it relates to the production of such synthetic polymeric products by the reaction of an oligomeric para-, meta- or di-meta-aminobenzoic acid ester or amide and a polyisocyanate.

The production of polymeric products such as polyurethane elastomers by the diisocyanate polyaddition process has found widespread commercial application and is described in numerous patents and other literature. Typically, the production of an elastomer by the diisocyanate polyaddition process will involve the formulation and curing of a composition comprising a polyol, a diisocyanate and a chain-extending or curing agent. Frequently, the polyol, such as a polyester or polyether polyol having terminal hydroxyl groups and a molecular weight, for example, in the range of 750 to 2000, will be pre-reacted with a diisocyanate to provide an isocyanate-terminated prepolymer which may then be reacted with a chain-extending or curing agent for the production of a polyurethane elastomer.

Various systems have been utilized for the production of polyurethanes from a liquid or semi-liquid state. Notably, the commercial manufacture of polyurethane elastomers has been accomplished by the reaction of a polyol and a toluene diisocyanate (TDI), either in admixture or pre-reacted, and a chain-extending or curing agent such as MOCA, i.e., 4,4'-methylene bis(o-chloroaniline). Similarly, a system based upon a polyol and 4,4'-diphenylmethane diisocyanate (MDI) and a 1,4-butanediol curative has achieved commercial application as an alternative to TDI-MOCA systems for the production of polyurethane elastomers.

The various systems utilized for the production of synthetic polymers may have certain disadvantages with regard to the handling and working of the systems and the properties of the resulting polymeric materials. Thus, for example, the utilization of a MOCA or other diamine curative may necessitate the heating of the reaction components to assure adequate mixing of the curative and to prevent crystallization thereof from the reaction system. The employment of elevated temperatures may, however, increase reactivity and cause premature curing thereby limiting the time available for mixing and handling the desired mixture. Similarly, certain problems are associated with the utilization of 1,4-butanediol curative in, for example, a 1,4-butanediol/MDI system. The curative tends to pick up moisture as the result of exposure to the atmosphere and frequently results in the appearance of bubbles or foaming in the cured polymer. In addition, the resulting polymeric material often exhibits a "cheesy" character, thus, hampering demolding of fabricated pieces. Neither the employment of a TDI/MOCA system nor a 1,4-butanediol/MDI system is especially suited to a hand-mixing operation from the standpoint of pot life, and where the manufacture of cured parts by fabricators utilizing such operations is an important consideration, the employment of such systems may be decidedly disadvantageous.

The polyurethane materials of commerce, in addition to the presence of repeating urethane groups, may contain other groups such as urea, ester, ether, aromatic, amine, biuret or allophanate groups. The number, variation and repeatability of these groups along with the urethane groups will depend upon the active hydrogen-bearing materials reacted with a diisocyanate for production of a polymer. The manner in which these groups are combined will determine to a large extent the major physical properties of the finished polymer. While the utilization of a particular reaction system involving particular reactants will be determined in part by the dictates of major physical properties required in a finished polymer, the convenience and ease of handling and fabrication will likewise be important considerations in the utilization of a particular system for the production of a polymeric material. Accordingly, a system for the production, by a simple and effective isocyanate polyaddition process, of synthetic polymers exhibiting useful physical properties will be especially advantageous.

SUMMARY OF THE INVENTION

The present invention provides synthetic polymers by an isocyanate polyaddition process whereby a polyisocyanate is reacted with substantially an equivalent amount of an oligomeric para-, meta- or di-meta-aminobenzoic acid ester or amide having the formula

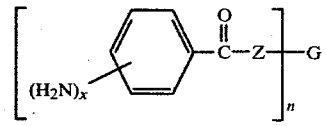

wherein n is an integer of from 2 to 4; each x is one or two; each benzoyl nucleus is para-, meta- or di-meta-amino- substituted; each Z is

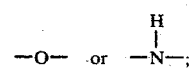

and G is an n-valent radical which may be obtained by the removal of hydroxyl or amino groups, respectively, from an n-valent oligomeric polyol or polyamine having a molecular weight of from about 400 to about 6,000. Thus, synthetic polymers having useful and desirable physical properties can be simply and effectively provided from a reaction system based upon substantially equivalent amounts of a polyisocyanate and an oligomeric para-, meta- or di-meta-aminobenzoic acid or amide of the aforedescribed formula. The present invention is based in part upon the incorporation of the backbone of an oligomeric polyol or polyamine, in the form of an n-valent radical G, into an aminobenzoic acid ester or amide having the hereinbefore described formula and the utilization of the resulting oligomeric aminobenzoic acid ester or amide in a polyisocyanate addition process, without the required employment of a curative or chain-extending agent, in the production of useful synthetic polymeric products. In its process aspect, the present invention, thus, provides a method whereby such synthetic polymeric products can be simply and effectively provided by the reaction of a polyisocyanate and the oligomeric aminobenzoic acid ester or amide. This method, thus, represents a departure from the conventional isocyanate polyaddition process involving the reaction of a curative or chain-extending agent with an admixture or pre-reacted product of a polyol and a polyisocyanate. Various objects, details, operations, uses, advantages and modifications of the invention will be apparent from the following more detailed description.

DETAILED DESCRIPTION OF THE INVENTION

As described hereinbefore, the synthetic polymers of the present invention are prepared by a polyaddition process whereby a polyisocyanate is reacted with a substantially equivalent amount of an oligomeric aminobenzoic acid ester or amide having the following formula:

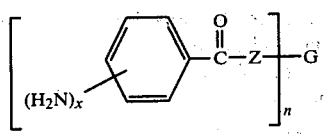

wherein n is an integer of from 2 to 4; each x is one or two; each benzoyl nucleus is para-, meta- or di-meta-amino- substituted; each Z is

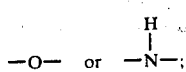

and G is an n-valent radical which may be obtained by the removal of hydroxyl groups or amino groups, respectively, from an n-valent polyol or polyamine having a molecular weight of from about 400 to about 6,000. It will be appreciated that the characterization of radical G (as an n-valent radical which may be obtained by the removal of hydroxyl groups or amino groups, respectively, from an n-valent polyol or polyamine) is set forth for convenience in defining the nature of radical G per se, notwithstanding that abstraction or removal of hydroxyl or amino groups from such polyol or polyamine is not mechanistically involved in the synthesis or production of the oligomeric aminobenzoic acid esters and amides hereof.

It will be seen from inspection of the formula set forth hereinbefore that the oligomeric aminobenzoic acid esters utilized in the present invention comprise di-, tri- and tetra-(aminobenzoate) esters of oligomeric polyol materials where n is, respectively, 2, 3 or 4. Correspondingly, the oligomeric aminobenzoic acid amides comprise di-, tri- and tetra-(aminobenzoic acid) amides of oligomeric polyamine materials where n is, respectively, 2, 3 or 4. Inasmuch as the aromatic rings of the benzoyl moieties of the esters and amides each contain one or two amino groups, the oligomeric amino benzoic acid esters and amides may be termed oligomeric polyamines. Accordingly, the term "oligomeric polyamine" can be utilized in reference to the essential aminobenzoic acid ester or amide components of the polyaddition product and process of the present invention.

The oligomeric aminobenzoic acid esters utilized in the practice of the polyaddition process of the present invention are aminobenzoate esters of oligomeric polyol materials and can be conveniently provided by reaction of a nitro-substituted benzoyl halide, or a nitro-substituted benzoic acid, with a suitable polyol, such as polyalkylene ether or ester polyol, followed by reduction of the nitro groups of the resulting product to the corresponding amino groups. Thus, for example, an oligomeric di-(p-aminobenzoate) ester useful herein can be prepared by reaction of two moles of p-nitrobenzoyl chloride with one mole of a dihydric alcohol such as poly(ethylene glycol) having a molecular weight in the range of from about 400 to about 6,000 and by reduction of the resulting poly(ethylene glycol) di-(p-nitrobenzoate) ester. This reaction is illustrated by the following reaction scheme wherein the value of integer a is such as to provide a molecular weight within the aforedescribed range:

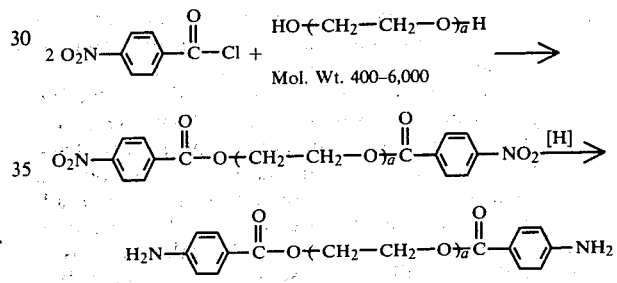

In like manner, oligomeric aminobenzoic acid amides useful herein can be provided by reaction of a nitro-substituted benzoyl halide, or a nitro-substituted benzoic acid, with a suitable polyamine, followed by a reduction of the benzoyl halide or benzoic acid nitro-substitutes to corresponding amino groups. For example, an oligomeric di-(p-aminobenzoic acid) amide useful herein can be prepared by reaction of two moles of p-nitrobenzoic acid with one mole of an oligomeric diamine such as a propoxlated propylene diamine having a molecular weight in the range of from about 400 to 6,000 and by reduction of the nitro groups to amino groups. This reaction is illustrated by the following reaction scheme wherein the value of integer c is such as to provide a molecular weight within the aforedescribed range:

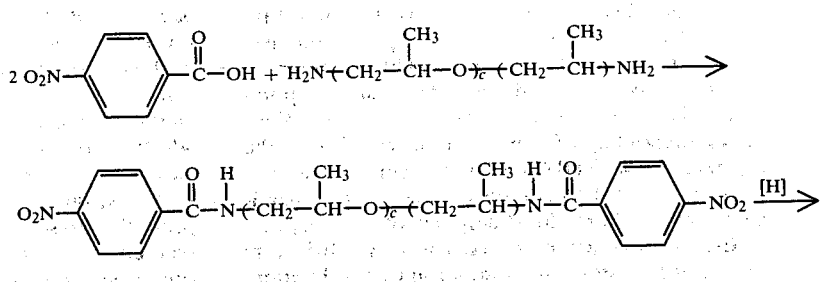

-continued

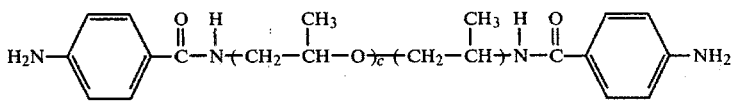

The nature of radical G of the aminobenzoic acid esters and amides can vary and will depend upon the nature of the oligomeric polyol and polyamine materials utilized in the preparation thereof. As indicated previously, the radical G will be derived from a polyol or polyamine material having a molecular weight of from about 400 to about 6,000. Preferably, the polyol or polyamine will have a molecular weight in the range of about 650 to 2,000. The radical G can comprise an n-valent saturated or unsaturated, straight chain or branched chain hydrocarbon radical which can be interrupted by oxygen ether atoms. For example, where a polyether polyol or a polyether polyamine is utilized in the preparation of an oligomeric aminobenzoic acid or amide, the corresponding G radical will comprise repeating oxygen ether atoms. Preferably, radical G will include such oxygen ether atoms.

It will be appreciated from inspection of the hereinbefore described representative formula that the nature of n-valent radical G will vary with the value of integer n. Thus, where n is two, radical G will be a divalent radical —G— obtained by removal or abstraction of two hydroxyl or amino groups, respectively, from an oligomeric polyol or polyamine having a molecular weight of from about 400 to about 6,000. In the case where n is three, G will represent a trivalent radical

obtained by removal of three hydroxyl or amino groups from a polyol or polyamine having a molecular weight in the same range. Similarly, when n is four, radical G will represent a tetravalent radical

obtained by removal of four hydroxyl or amino groups from a polyol or polyamine having a molecular weight in the same range.

The Z moieties of the oligomeric aminobenzoic acid ester and amide compounds hereof can independently be oxygen or imino groups and, accordingly, each Z is defined as being

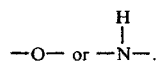

While the utilization of, for example, an oligomeric polyol or polyamine having, respectively, only hydroxyl or amino groups will be preferred from the standpoint of convenience and ease of preparation, compounds having both hydroxyl and amino groups can be utilized for the preparation of mixed aminobenzoic acid ester/amide compounds hereof. The preparation of such compounds can be illustrated by the following reaction scheme:

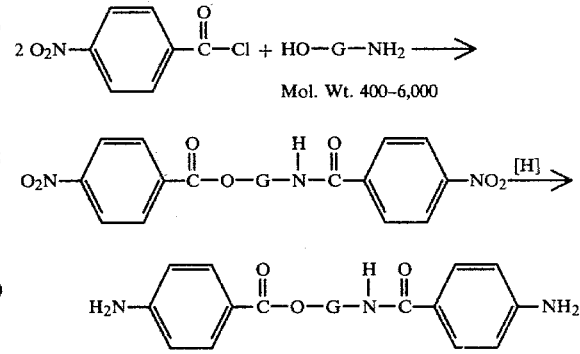

A number of polyol materials can be suitably employed for the preparation of the oligomeric aminobenzoic acid esters utilized herein. Examples of such polyols, which provide divalent, trivalent or tetravalent G radicals include oligomeric diols, such as polyalkyleneether glycols and polyalkylene-arylene-ether glycols; oligomeric triols, such as the polyalkyleneether glycerols or mixed polyalkylene-arylene-ether glycerols; and oligomeric tetrols, such as the polyalkyleneether pentaerythritols or mixed polyalkylene-arylene-ether pentaerythritols.

A preferred class of polyol materials useful in the preparation of the aminobenzoic acid esters herein comprises the polyalkyleneether glycols which provide a divalent G radical and which may be represented by the formula $HO(RO)_{\overline{a}}H$ wherein R is an alkylene radical containing up to ten carbon atoms and a is an integer sufficient to provide a molecular weight within the range of from about 400 to 6,000, and preferably, from about 650 to about 2,000. Preferably, R is an alkylene radical of from 2 to 4 carbon atoms. Examples of polyalkyleneether glycols useful herein include polyethyleneether glycol, polypropyleneether glycol, polyhexyleneether glycol, polytetramethyleneether glycol, polydecamethyleneether glycol, poly-1,2-dimethyl ethyleneether glycol and the copolymer of tetrahydrofuran and 1-allyloxy-2,3-epoxypropane. The polyalkyleneether glycols herein can be readily obtained, for example, by polymerization to suitable molecular weight of an alkylene ether, e.g., ethylene oxide, tetrahydrofuran, propylene oxide, or, an admixture thereof, in the presence of water or other low molecular weight alcohol or hydrogen-donor compound.

The polyalkylene-arylene-ether glycols can also be employed for the preparation of oligomeric p-aminobenzoic acid esters utilized herein. These glycols, similar in structure to the polyalkyleneether glycols, additionally contain arylene radicals. Thus, arylene groups such as phenylene, naphthylene and anthracene radicals can be present in the polyalkylene-arylene-ether glycols. In general, the arylene groups will be present in minor proportion relative to the alkylene groups. Normally, the glycol will contain at least one polyalkyleneether radical of molecular weight of about 500 for each arylene radical.

Another class of polyol materials suited to the preparation of oligomeric aminobenzoic acid esters useful herein comprises the class of hydroxy-containing hydrocarbon polymer materials having a molecular weight in the range of from about 400 to 6,000. Accordingly, the radical G derived therefrom will comprise an n-valent saturated or unsaturated, straight or branched chain hydrocarbon radical which may be obtained by removal of hydroxyl groups from a saturated or unsaturated straight or branched chain hydrocarbon polymer having a molecular weight within the previously set forth range. Preferably, the n-valent G radical will be an aliphatic hydrocarbon radical derived from an aliphatic hydrocarbon polyol. Examples of suitable hydrocarbon polyol materials include the polyols obtained from the polymerization of polymerizable ethylenically unsaturated monomers, such as 1,4-butadiene, and by the introduction of hydroxyl groups in known manner. Such polyol materials are known and can be prepared, for example, by free-radical initiated polymerization of a polymerizable ethylenically-unsaturated monomer to provide a dicarboxylate-substituted hydrocarbon polymer, for example, a dicarboxylate-terminated polymer. Reduction in known manner provides an aliphatic hydrocarbon polyol, for example, an aliphatic hydrocarbon diol. A suitable method for the production of such polyol materials is described in greater detail in U.S. Pat. No. 2,888,439 (issued May 26, 1959 to D. M. Simons).

As indicated previously, the polyol materials useful for the preparation of the oligomeric aminobenzoic acid esters utilized herein also include polyols capable, by abstraction, respectively, of three or four hydroxyl groups, of providing a trivalent or tetravalent radical G. Thus, polyalkyleneether polyols and mixed polyalkylene-arylene-ether polyols derived from such polyhydric alcohols as glycerol, trimethylolpropane, pentaerythritol and the like can be employed. Such materials can be obtained by oxyalkylation as, for example, by reaction of glycerol or pentaerythritol with ethylene oxide, propylene oxide or a mixture thereof. The resulting trifunctional and tetrafunctional ethers may be advantageously employed for the preparation of oligomeric tri- and tetra-(aminobenzoate) esters which can be suitably employed for the production of polymers having increased cross-linking.

A variety of polyamines can be utilized for the preparation of oligomeric aminobenzoic acid amides useful herein. Examples of such polyamines, which provide divalent, trivalent or tetravalent G radicals include oligomeric diamines, triamines and tetramines. For example, oligomeric diamines useful for the provision of oligomeric aminobenzoic acid amides include polyamines of the formula

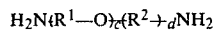

wherein each of $R^1$ and $R^2$ is a divalent saturated or unsaturated, straight chain or branched chain hydrocarbon radical; c is zero or an integer; d is an integer; and the combined value of c and d is such as to provide a molecular weight for the polyamine of from about 400 to about 6,000. Preferably, each of $R^1$ and $R^2$ is an aliphatic, straight or branched chain divalent hydrocarbon radical, e.g., an alkylene radical of from 2 to 10 carbon atoms, and more preferably from 2 to 4 carbon atoms. Suitable polyamines are known and commercially available and can be obtained, for example, by polymerization of an alkylene oxide and conversion of terminal hydroxyl groups to amino groups by known amination technique.

The polyol and polyamine materials from which the n-valent G radical is derived can contain substituent moieties where such substituents do not interfere with the desired reaction of the aminobenzoic acid ester or amide with an isocyanate. Alkyl or halo substituents, for example, can be suitably present. The n-valent G radical can also contain repeating oxygen ether atoms as will be the case where the polyol or polyamine from which radical G is derived comprises, for example, a polyalkyleneether glycol, a polyalkyleneether glycerol, a polyalkyleneether pentaerythritol, a mixed polyalkylene-arylene-ether polyol or an amine-terminated polyalkyleether. The polyol and polyamine materials can additionally contain ester linkages. Thus, polyol materials of suitable molecular weight, i.e., in the range of from about 400 to 6,000, having ester linkages as may be obtained, for example, by reaction of a polycarboxylic acid and a polyhydric material can be suitably employed. Examples of such polyols having ester groups include the oligomeric polyester polyols such as may be obtained by the condensation of adipic acid and ethylene glycol.

The oligomeric aminobenzoic acid esters utilized herein for the production of polymeric products include the di-(aminobenzoate) esters (obtained, for example, by reaction of two moles of a nitro-substituted benzoyl chloride with one mole of an oligomeric glycol having a molecular weight of about 400 to about 6,000, followed by reduction of nitro-to-amino- groups); and the tri- (aminobenzoate) esters (from three moles of a nitro-substituted benzoyl chloride and one mole of an oligomeric triol of molecular weight of about 400 to about 6,000, followed by reduction of nitro- to amino-groups). Similarly, the oligomeric aminobenzoic acid esters include the tetra-(aminobenzoate) esters derived from four moles of a nitro-substituted benzoyl chloride per mole of an oligomeric tetrol of molecular weight of about 400 to about 6,000, followed by a suitable nitro- to amino group reduction. These oligomeric aminobenzoate esters can conveniently be represented by the following formulae:

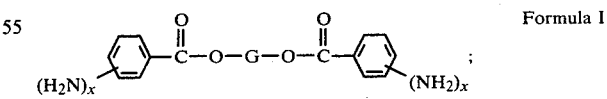

Formula I

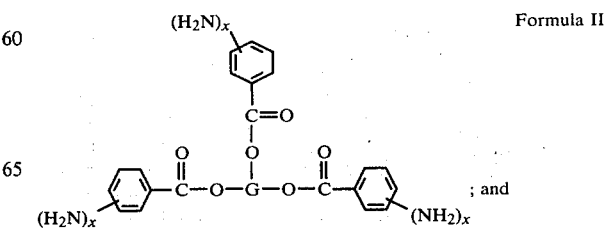

Formula II

-continued

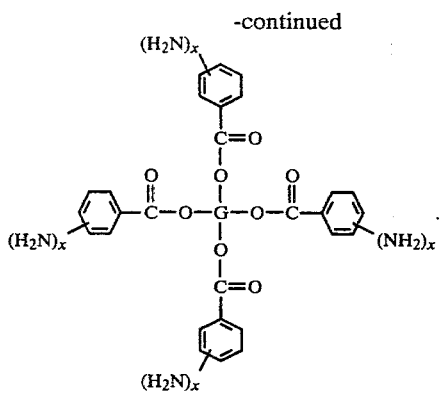

Formula III

Similarly, the oligomeric aminobenzoic acid amides utilized herein for the production of polymeric products include the di-(aminobenzoic acid) amides, the tri-(aminobenzoic acid) amides and the tetra-(aminobenzoic acid) amides. These oligomeric aminobenzoic acid amides can conveniently be represented by the following formulae:

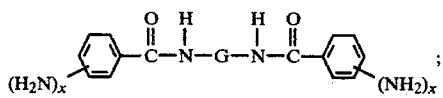

Formula IV

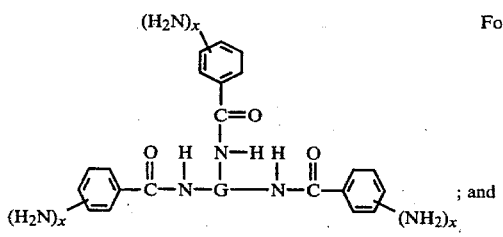

; and

Formula V

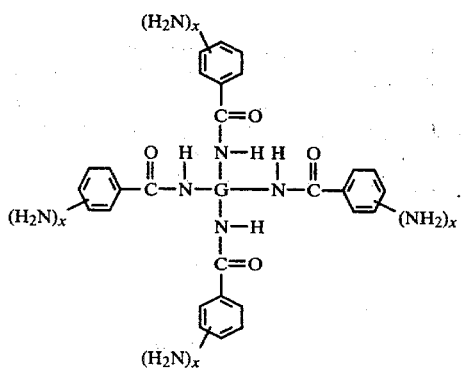

Formula VI

In the formulae shown for the oligomeric aminobenzoate esters hereof (Formulae I, II, and III) and the oligomeric aminobenzoic acid amides (Formulae IV, V, and VI), G will represent, respectively, a divalent, trivalent or tetravalent radical derived from a polyol or polyamine having a molecular weight in the range of about 400 to about 6,000, and preferably, in the range of from about 650 to about 2,000. As will be apparent from inspection of each of the formulae set forth hereinbefore, the phenyl group of each benzoyl moiety contains one or two amino groups depending upon the value of each x as one or two. The amino groups are positioned such that each benzoyl nucleus is para- amino-substituted, meta- amino-substituted or di-meta- amino-substituted. Accordingly, the oligomeric aminobenzoic acid esters and esters hereof are inclusive of para-aminobenzoic acid esters and amides; meta- aminobenzoic acid esters and amides; and di-meta-aminobenzoic acid esters. It will be appreciated that each benzoyl moiety of an oligomeric aminobenzoic acid ester or amide hereof, while para-, meta- or di-meta- amino-substituted, need not be indentically substituted. Preferred oligomeric aminobenzoic acid esters and amides herein are those wherein the benzoyl moieties are each para- amino-substituted. In addition to the amino-group substitution of the benzoyl moieties, the benzoyl groups can be substituted with non-interfering groups. Accordingly, the benzoyl moieties of the aminobenzoic acid ester and amide compounds hereof can be substituted with halogen, alkyl or other substituents which do not interfere with the desired polyisocyanate addition process.

Examples of oligomeric aminobenzoic acid esters useful herein and represented by Formula I include the following wherein a and b are integers having values corresponding to molecular weights for the polyols from which they are derived of from about 400 to about 6,000.

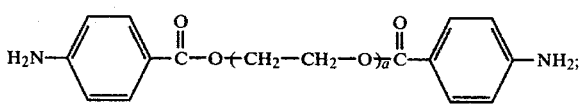
A.

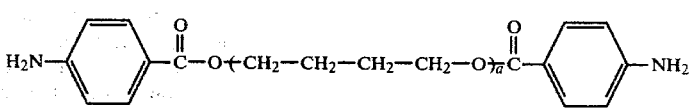
B.

C.

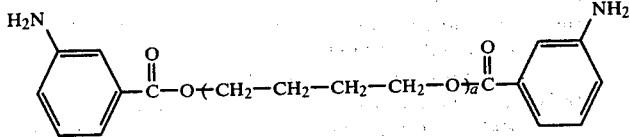

D.

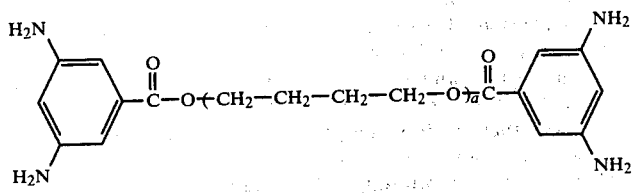

E.

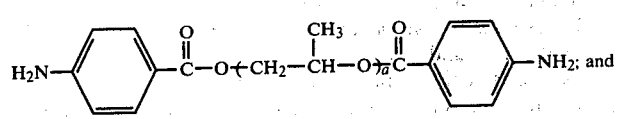

F.

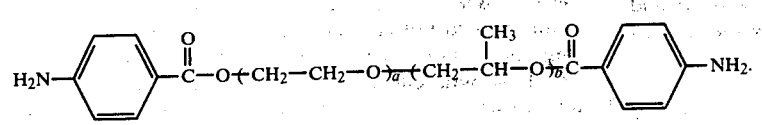

Examples of oligomeric aminobenzoate esters useful herein and represented by Formula II include the following wherein a and b are integers having values corresponding to the molecular weights for the polyols from which they are derived of from about 400 to about 6,000.

G.

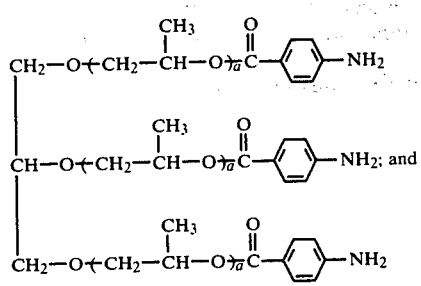

H.

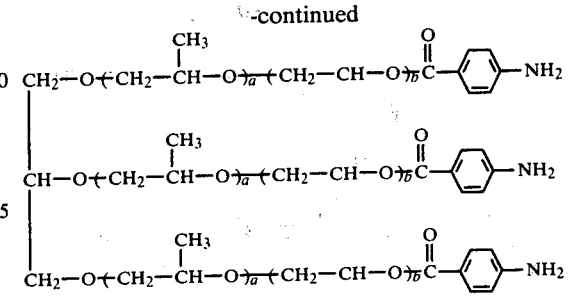

An example of an oligomeric aminobenzoate ester represented by Formula III includes the following wherein each a is an integer having a value corresponding to a molecular weight for the polyalkyleneether pentaerythritol from which the aminobenzoate ester is derived of from about 400 to about 6,000.

I.

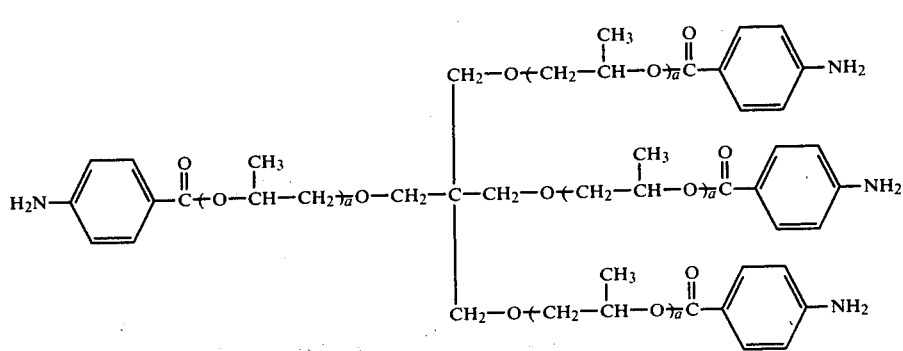

Examples of oligomeric aminobenzoic acid amides useful herein and represented by Formula IV include the following wherein each c is an integer having values corresponding to molecular weights for the polyamines from which they are derived of from about 400 to about 6,000.

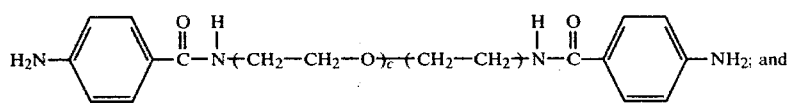 J.

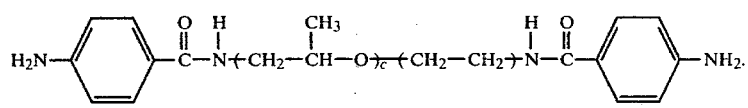 K.

An example of an oligomeric aminobenzoic amide useful herein and represented by Formula V is the following wherein each c has a value corresponding to the molecular weight for the polyamine from which the amide is derived of from about 400 to about 6,000.

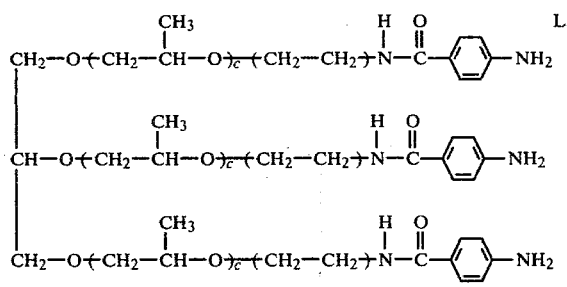 L.

An example of an oligomeric aminobenzoic acid amide represented by Formula VI includes the following wherein each c is an integer having a value corresponding to a molecular weight for the polyamine from which the amide is derived of from about 400 to about 6,000.

diisocyanate or a mixture (65/35 by weight) of 2,4-toluene diisocyanate and 2,6-toluene diisocyanate; tetramethylene diisocyanate; hexamethylene diisocyanate; xylene diisocyanate; 1,5-napththylene diisocyanate; 1,4-phenylene diisocyanate; 4,4'-diphenylmethane diisocyanate (MDI); 4,4'4''-triphenylmethane triisocyanate; and 3,3'-dimethyl-4,4'-diphenylmethane diisocyanate. Aliphatic diisocyanates such as the $C_{36}$ aliphatic diisocyanate derived from the dimer of ricinoleic acid can be suitably employed and are commercially available, for example, as DDI-1410 (Henkel Corporation, Resin Division, Minneapolis, Minn.). The polyisocyanates hereof are known polyisocyanates in the field of polyurethane technology and can be employed singly or in admixture. Other examples of such polyisocyanates can be found, for example, in *The Development and Use of Polyurethane Products*, E. N. Doyle, McGraw-Hill Book Company, page 27 (1971).

Preferred polyisocyanates for employment in the process of the present invention are polyisocyanate materials in a liquid form at ambient temperatures. These materials facilitate the production of polymeric products from normally liquid oligomeric aminobenzoic acid esters or amides and obviate the requirement

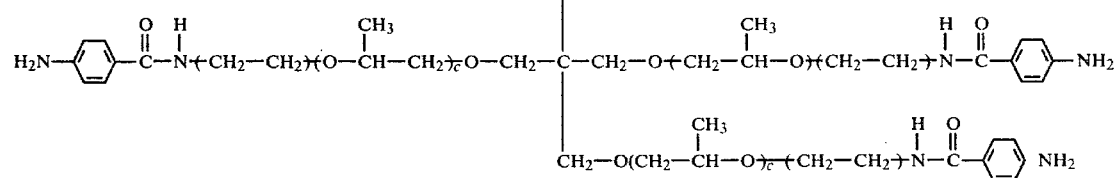
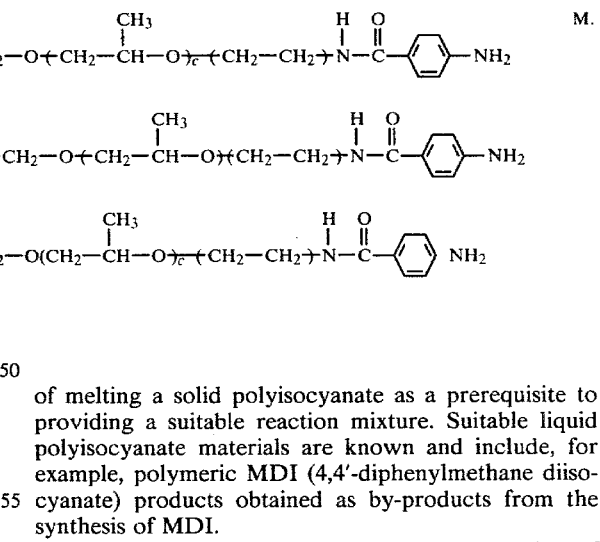 M.

The synthetic polymers prepared by the process of the present invention are prepared by a polyaddition process involving the reaction of an oligomeric aminobenzoic acid ester or amide as defined hereinbefore with substantially an equivalent amount of a polyisocyanate. In accordance with such a process, an oligomeric aminobenzoic acid ester or amide having, for example, the structure represented by Formula B or K will be reacted with substantially an equimolar amount of a diisocyanate, for example, a diisocyanate such as 4,4'-diphenylmethane diisocyanate.

Polyisocyanates useful in the production of synthetic polymers by the process of the present invention include a variety of polyisocyanate materials employed in the production of conventional polyurethanes. These include a variety of aliphatic polyisocyanates and aromatic polyisocyanates. Examples of suitable polyisocyanates include the toluene diisocyanates (TDI) such as 2,4-toluene diisocyanate; 2,6-toluene diisocyanate; mixtures of TDI isomers such as a mixture (80/20 by weight) of 2,4-toluene diisocyanate and 2,6-toluene of melting a solid polyisocyanate as a prerequisite to providing a suitable reaction mixture. Suitable liquid polyisocyanate materials are known and include, for example, polymeric MDI (4,4'-diphenylmethane diisocyanate) products obtained as by-products from the synthesis of MDI.

In the production of MDI by the condensation of aniline with formaldehyde and the conversion of amino to corresponding isocyanate groups, a content of the initially formed bis-adduct of aniline and formaldehyde reacts further with the reaction mixture to form polymeric aniline derivatives which are in turn converted to isocyanates. Typically, such polymeric derivatives will have a functionality of from about 4 to about 15, for example, about 10 isocyanate groups per molecule. Products containing such polymeric polyisocyanates in the form of a pot residue after removal of pure MDI by distillation can be utilized. Similarly, polyisocyanate products comprising such polymeric polyisocyanate species in admixture with pure MDI, i.e., the undistilled reaction mixture, can also be employed. Polymeric MDI products can be employed herein to advantage and are commercially available under such trade designations as Rubinate M (available from Rubicon Chemicals Inc., Geisman, La.) and PaPI 27, PaPI 135, PaPI 580 and PaPI 901 (available from the Upjohn Company, Kalamazoo, Mich.).

Another liquid polyisocyanate material which can be employed where cross-linking is desirably introduced into the polymeric products hereof comprises an admixture of MDI and a tri-functional cycloaddition product of MDI. An admixture of MDI and a tri-functional cycloadduct having the following structure, where R is

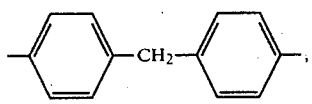

can be employed:

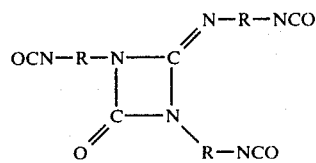

Such an admixture is available under the designation "Liquid MDI", Isonate 143L (The Upjohn Company, Kalamazoo, Mich.).

The process of the present invention can be utilized for the production of polymeric products by reaction of an oligomeric aminobenzoic acid ester or amide and substantially an equivalent amount of the polyisocyanate under a variety of reaction conditions. The reaction can be suitably conducted under conditions of room temperature with the provision of polymeric products within suitable pot-life and demold-time parameters. Where desired, to facilitate polymerization, the reaction system can be heated. It has been found, however, that the process of the present invention permits the fabrication of polymeric pieces from reaction mixtures having, in general, a pot life of at least five minutes and that the polymeric pieces can be demolded within about 15 minutes.

The oligomeric aminobenzoic acid ester or amide and polyisocyanate components are reacted in substantially equivalent proportions. As used herein, the term "substantially equivalent" refers to the utilization, in general, of an amount of polyisocyanate reactant of about 0.9 to 1.2 equivalents per equivalent of the oligomeric aminobenzoic ester or amide, based upon the isocyanate groups and amino groups, respectively of the polyisocyanate and oligomeric aminobenzoic acid ester or amide reactants. Preferably, from about 1.0 to about 1.15 equivalent of polyisocyanate material per equivalent of oligomeric aminobenzoic acid ester or amide is employed.

The particular oligomeric aminobenzoic acid ester or amide and polyisocyanate reactants utilized in the conduct of the process of the invention can be varied for desired control of elastomer properties in finished pieces, for control of handling characteristics or to otherwise permit latitude in reaction conditions. The aminobenzoic acid esters and amides utilized herein can be employed in a polyisocyanate polyaddition process in admixture. For example, a mixture of a para- aminobenzoic acid ester or amide can be utilized in combination with a meta-aminobenzoic acid ester or amide. Where a mixture of the p-aminobenzoic acid ester or amide and meta- aminobenzoic acid ester or amide is employed, the polyisocyanate will be utilized in an amount substantially equivalent, as defined herein, to the amine functionality of the mixture of aminobenzoic acid ester or amide. A mixture, for example, of oligomeric aminobenzoate esters having para- and meta- amino substitution can be employed for desirable control of rate of reaction. Such mixtures include a mixture of a di(4-aminobenzoate)ester having the formula

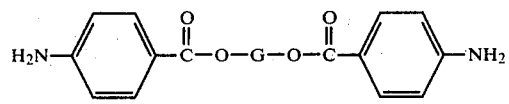

wherein G represents a divalent radical obtained by the removal of two hydroxyl groups from an oligomeric polyol having a molecular weight in the range of about 400 to about 6,000; and from about 1% to about 50% by weight of said di-(4-aminobenzoate) ester, of a di-(3aminobenzoate) ester having the formula

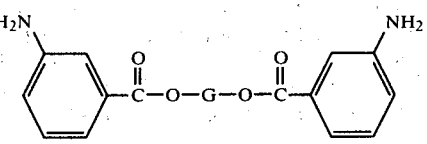

wherein G represents a divalent radical obtained by the removal of two hydroxyl groups from an oligomeric polyol having a molecular weight in the range of from about 400 to about 6,000.

A preferred polyaddition reaction system utilizing such an admixture involves the reaction of a polyisocyanate with a mixture of isomeric aminobenzoate esters having the formulae

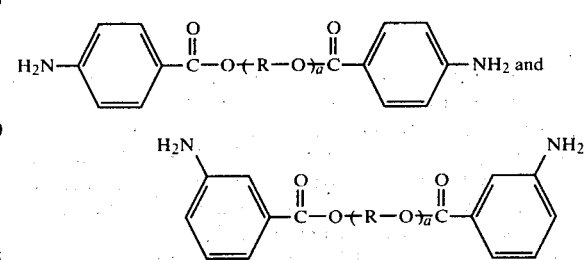

wherein each R is an alkylene of from two to ten, and preferably, two to four carbon atoms; and each a is an integer such that the molecular weight of the polyalkyleneether glycols from which the aminobenzoate esters are derived is in the range of from about 400 to about 6,000, and preferably from about 650 to about 2,000. The utilization of an admixture of such isomers permits desired control of the rate of reaction of the polyisocyanate polyaddition process. The controlled addition of meta-substituted isomer (having greater reactivity than the corresponding para-substituted isomer) to a reaction system comprising the para-substituted isomer permits pot life and demold times to be adjusted to more suitably meet the pot life/demold time requirements of particular applications.

Another preferred polyaddition reaction system of the present invention involves the reaction of a polyisocyanate with a mixture of an oligomeric di-(4-aminobenzoate)ester and an oligomeric di-(3,5-diaminobenzoate)ester. Such mixtures include a mixture of a di-(4-aminobenzoate)ester having the formula

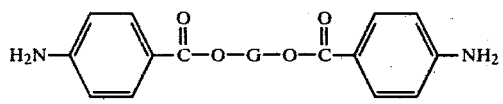

wherein G represents a divalent radical obtained by the removal of two hydroxyl groups from an oligomeric polyol having a molecular weight in the range of from about 400 to about 6,000; and from about 1% to about 15% by weight of said di-(4-aminobenzoate) ester, of a di-(3,5-diaminobenzoate) ester having the formula

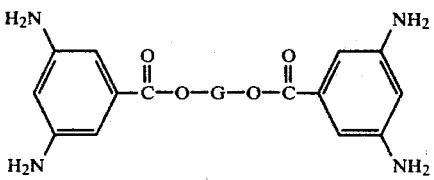

wherein G represents a divalent radical obtained by the removal of two hydroxyl groups from an oligomeric polyol having a molecular weight in the range of from about 400 to about 6,000.

A preferred polyaddition reaction system utilizing such an admixture involves the reaction of a polyisocyanate with a mixture of oligomeric di-(aminobenzoate) esters having the formulae

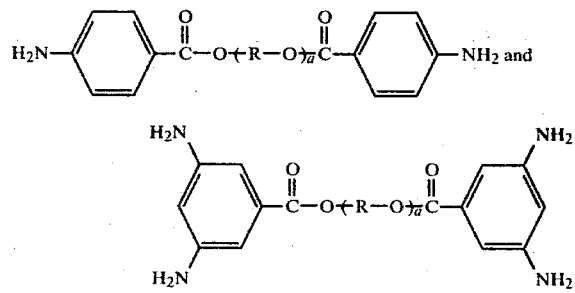

wherein each R is an alkylene radical of from two to ten, and preferably, two to four carbon atoms; and each a is an integer such that the molecular weight of the polyalkyleneether glycols from which the aminobenzoate esters are derived is in the range of from about 400 to about 6,000, and preferably from about 650 to about 2,000. The utilization of a content of the tetramine compound, i.e., the di-(3,5-diaminobenzoate) ester, in the polyaddition reaction system permits crosslinking reactions to occur in the polyisocyanate reaction and, thus, provides a means for controlling cross-linking in accordance with the dictates of physical properties required in a particular elastomeric product.

The p-aminobenzoic acid esters and amides utilized herein can be reacted with a polyisocyanate, if desired, in combination with, for example, a di(3-aminobenzoic- )acid ester or amide and a di(3,5-diaminobenzoic)acid ester or amide. A suitable reaction includes, for example, the reaction of a polyisocyanate with substantially an equivalent amount of a mixture of aminobenzoate esters comprising a di(4-aminobenzoate ester having the formula

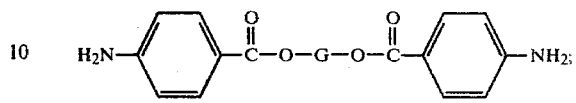

and by weight of the di(4-aminobenzoate)ester, about 1% to about 50%, of a mixture of a di(3-aminobenzoate)ester having the formula

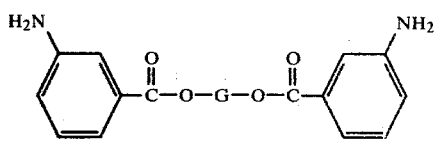

and a di-(3,5-diaminobenzoate)ester having the formula

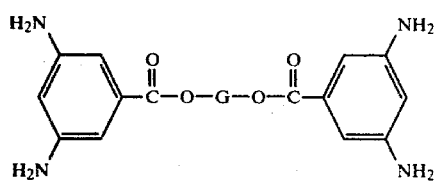

wherein each G represents a divalent radical obtained by the removal of two hydroxyl groups from an oligomeric polyol having a molecular weight in the range of from about 400 to about 6,000.

Where mixtures of the oligomeric aminobenzoic acid esters or amides, as described hereinbefore are desirably reacted with a polyisocyanate, there can be employed such mixtures as are obtained, for example, from the reaction of a mixture of nitro-substituted benzoic acids or halides with a polyol or polyamine, followed by reduction of nitro- to amino-groups. Thus, two mols of a mixture of p-nitrobenzoyl chloride and m-nitrobenzoyl chloride can be suitably reacted with a mole of polyol or polyamine for production of a statistical distribution of isomeric di(nitrobenzoic) acid esters or amides. Reduction of nitro- to amino-groups provides a corresponding mixture of isomeric di(aminobenzoic) acid esters or amides useful herein. Similarly, two moles of a mixture of p-nitrobenoyl chloride and 3,5-dinitrobenzoyl chloride can be suitably reacted with a mole of polyol or polyamine to provide a statistical distribution of nitrosubstituted benzoic acid esters or amides, which upon hydrogenation, provides a mixture of amino-substituted oligomers useful for reaction with a polyisocyanate as described herein.

A mixture of di-(aminobenzoate) ester and tri-(aminobenzoate) ester oligomers, as represented by Formulas I and II hereinbefore, can also be utilized, particularly where increased cross-linking is desired. Similarly, mixtures of polyisocyanate reactants can be employed to advantage for control of cross-linking in finished pieces. Accordingly, another reaction system of the present invention involves the reaction of a polyisocyanate with a mixture of oligomeric aminobenzoates comprising a di(aminobenzoate) ester as represented by the structure of Formula I, and by weight of the di(aminobenzoate)ester, from about 1% to about 20%, of a tri(aminobenzoate) ester having the structure of Formula II. Such reaction system permits the fabrication of liquid-cast elastomeric pieces exhibiting desired physical properties while providing efficient pot life and demold time parameters.

The synthetic polymers prepared by the process of the present invention include cast polymeric materials which can, for example, be formed by the casting of a mixture of an aminobenzoic acid ester or amide and a polyisocyanate and the curing thereof to a polymeric material. The polymeric materials can be formulated to the characteristics of thermosetting or thermoplastic polymers. As used herein, the term "cast polymeric materials" refers to solid non-cellular synthetic polymers which are formed by the casting of the reaction mixture of the polyaddition process hereof and the curing thereof to a polymeric product. These cast polymers can be distinguished from the cellular polymers formed by action of a blowing agent and commonly referred to as polymeric foams. The synthetic polymers of the invention also include, however, such polymeric foams which can be prepared by including any of a variety of blowing agents in the reaction mixtures from which the polymers of the invention are prepared.

Synthetic cast polymers prepared by the process of the present invention can be suitably formed by casting a reaction mixture of an aminobenzoic acid ester or amide and polyisocyanate, for example, into a mold and allowing the curing of the reaction mixture to a thermosetting or thermoplastic polymeric material. The reaction components can be admixed in a container and the contents thereof can be discharged or otherwise introduced into a mold for desired curing. A suitable technique for forming the cast polymers hereof, particularly in high-production modes, involves the mixing, as by in-line mixing, of the reaction components immediately prior to the casting of the reaction mixture into a suitable mold for curing. The reaction components can be utilized in connection with conventional casting and molding operations including extrusion, rotation molding and like operations where the reaction components are proportioned and mixed for curing to a solid non-cellular polymeric material. While the reaction mixtures and process hereof can be employed in the production of cast pieces or fabrications formulated to suit the requirements of hard, abrasion-resistant, flexible pieces of thermosetting or thermoplastic character as desired, the process hereof can also be utilized in the production of solid cellular or non-cellular polymeric coatings or films. These coatings or films can be provided by coating the reaction components, in neat form or in admixture with an organic solvent, onto a coatable substrate and allowing the coating to cure to the desired polymeric film or coating.

The process of the present invention permits the realization of certain advantages in the manufacture of polymeric materials, particularly cast elastomeric pieces or fabrications prepared by a variety of casting and molding operations. As indicated hereinbefore, the polymeric materials hereof can be conveniently prepared without resort to the utilization of chain-extending or curing agents conventionally employed in the polyurethane art. The provision of an oligomeric moiety in an aminobenzoic acid ester or amide, thus, permits the production of polymeric materials having useful physical characteristics by the simple and direct reaction of an oligomeric aminobenzoic acid ester or amide as described herein with a polyisocyanate reactant. The requirement of dissolving a solid curvature in a reaction system as a prerequisite to the casting and production of polymeric products is, thus, also obviated.

It may be noted from the disclosure in U.S. Pat. No. 3,256,213 (issued June 14, 1966 to G. T. Gmitter et al.) that it has been proposed that a long chain polyamino compound be substituted for all or part of the polyether glycol and polyol reactants theretofore employed in the production of cellular polyether-polyurethanes. Included among the polyamino organic compounds described as suitable for reaction with the isocyanato groups of an isocyanate are the polyalkylene ethers terminated with primary or secondary amino groups, the aminoesters of hydroxy terminated polyalkylene ethers, the di(amino esters) of hydroxy terminated long chain aliphatic hydrocarbons derived from polydienes such as polybutadiene, polyisoprene and the like, and the polydiene diamines having substantially terminal amino groups and hydrogenated polydiene diamines which may or may not contain residual ethylenic double bonds in the molecules. It is disclosed in the patent that a complete replacement of the polyalkylene ether glycols or polyols by a long chain di- or polyamino organic compound effects an almost instantaneous reaction and that the good mixing necessary to produce a cellular product is obtained only with difficulty. This difficulty is eliminated by forming a salt of the polyamino compound which can then be thoroughly admixed with the isocyanate reactants, catalysts, surface active agents and the like without premature reaction of the polyamino compound and isocyanate. The addition to this mixture of a basic material such as calcium oxide, tertiary amines or the like which reacts with the amine salt to yield the free amine is described as permitting the reaction of the amine with the isocyanate such that the cellular polyurethane is produced.

The process of the present invention represents a departure from the disclosure of U.S. Pat. No. 3,256,313 in that the process of the invention permits the production of polymeric products by a simple and direct reaction of a polyisocyanate and an oligomeric aminobenzoic acid ester or amide as described hereinbefore without the presence in the reaction mixture of polyalkylene ether glycols or polyols. The utilization of such oligomeric aminobenzoic acid ester or amide materials as components for reaction with a polyisocyanate in accordance with the present invention permits desired production of polymeric materials without instantaneous or near-instantaneous reactivity. As indicated hereinbefore, the process of the present invention permits the fabrication of polymeric materials from reaction mixtures having suitable pot-life, in general, of at least five minutes. This desirable reaction system parameter is realized without need of polyalkylene ether glycols or polyols or acidic agents utilized for reaction rate control by formation of a polyamine salt. Inasmuch as the polyalkylene ether glycols and polyols described in U.S. Pat. No. 3,256,213 are not included as reactants in the process of the present invention, the resulting polymers do not contain the reaction products of an isocyanate and such polyalkylene ether glycols or polyols. Similarly, the acidic, amine salt-forming agents described in U.S. Pat. No. 3,256,213 are not employed in the process hereof. Accordingly, the production of such other salts as are formed by the reaction of an amine salt and a subsequently added basic material, as described in the patent, is avoided. It is, thus, a significant aspect of the present invention that the reaction mixture utilized in the production of the polymers in accordance with the process of the invention is substantially free of polyalkylene ether glycols or polyols and reaction rate-controlling acidic, polyamine salt-forming agents. Accordingly, the polymers of the present invention are substantially free of the reaction product of an isocyanate and a polyalkylene ether glycol or polyol and substantially free of salts formed during production of the polymer by reaction of a basic material and an amine salt.

While the process of the present invention permits the production of polymeric materials without need for conventional curvature materials, additives or various types employed in the manufacture of polymeric products can desirably be employed in the reaction system hereof for their attending advantages. Thus, catalysts, ultraviolet absorbers, fillers, plasticizers, blowing agents or the like can be employed where desired.

The following Examples will better illustrate the nature of the present invention. Such Examples are intended, however, to be illustrative and not limitative. All parts or proportions are by weight unless otherwise indicated.

EXAMPLE I

This example illustrates the preparation of an oligomeric di-(p-aminobenzoate) ester of a polytetramethylene oxide diol. A reaction mixture was prepared by the addition to 500 cc. of toluene of the following ingredients: 253.6 g. (0.25 mole) of a polytetramethylene oxide diol having a molecular weight of about 1000 (Polymeg 1000 available from The Quaker Oats Company, Chicago, Ill.); 60.3 g. (0.6 mole) of triethylamine; and 106.3 g. (0.57 mole) of p-nitro-benzoyl chloride. The reaction mixture was heated and allowed to reflux overnight. The reaction mixture was cooled, filtered and washed with an aqueous solution (5% by weight) of sodium carbonate. The resulting product was evaporated with recovery of 266 g. of an amber resin.

The resinous product, as recovered above, was dissolved in one liter of ethanol. To the resulting solution was added 5 g. of 5%-palladium-on-carbon catalyst, followed by addition of 31.2 g (0.6 mole) of hydrazine hydrate. The resulting reaction mixture was heated, allowed to reflux for three hours, cooled, filtered and evaporated to yield 228 g. of a clear resin. Analysis of the resin indicated an amine equivalent of 1.58 milliequivalents per gram of resin (meq./g.). Completion of the esterification reaction of the p-nitrobenzoyl chloride with the hydroxyl groups of the polytetramethylene oxide diol was indicated by analysis of the resin product for residual acidity (0.02 meq.H+/g.). The resin product was an oligomeric di(-aminobenzoate) ester of polytetramethylene oxide diol, the product being represented by the following structure:

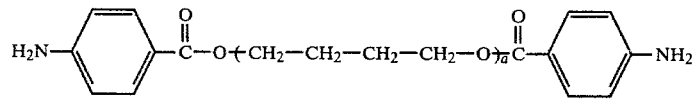

EXAMPLE II

This example illustrates the preparation of an oligomeric tri-(p-aminobenzoate) ester of a polypropylene oxide triol. A reaction mixture was prepared by the addition to 500 cc. of toluene of the following ingredients: 525 g. of a polypropylene oxide triol having a molecular weight of about 5,000 (available as Voranol 4701, from the Dow Chemical Company, Midland, Mich.); 60 g. of p-nitro-benzoyl chloride; and 40 g. of triethylamine. The reaction mixture was heated and allowed to reflux overnight. The reaction mixture was cooled, filtered, washed with an aqueous solution (5% by weight) of sodium carbonate and evaporated to yield 514.5 g. of an amber resin.

The amber resin, as recovered above, was dissolved in one liter of ethanol. To the solution was added 5 g. of a 5% palladium-on-carbon catalyst followed by 40 g. of hydrazine hydrate. The mixture was heated, allowed to reflux for three hours, cooled, filtered and evaporated to yield 228.8 g. of a clear resin product. The product was analyzed for amine equivalents (0.55 meq./g.) and for residual acidity (0.02 meq.H+/g.). The resin product was an oligomeric tri-(p-aminobenzoate) ester of polypropylene oxide triol, the product being represented by the following structure:

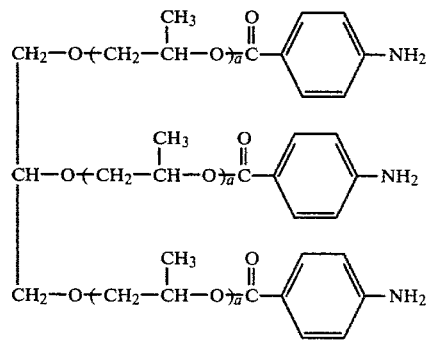

EXAMPLE III

This example illustrates, like Example I, the preparation of an oligomeric di-(p-aminobenzoate) ester of a polytetramethylene oxide diol, except that, this Example illustrates the utilization of a polytetramethylene oxide diol of lower molecular weight. A reaction mixture was prepared by addition to 500 cc. of toluene of the following ingredients: 165.5 g. of a polytetramethylene oxide diol having a molecular weight of about 650 (available as Polymeg 650, from the Quaker Oats Company, Chicago, Ill.); 106.3 g. of p-nitrobenzoyl chloride; and 60.3 g. of triethylamine. The reaction mixture was heated and allowed to reflux overnight. The reaction mixture was cooled, filtered, washed with an aqueous (5% by weight) solution of sodium carbonate and evaporated to yield 225 g. of an amber resin.

The amber resin, as recovered above, was dissolved in one liter of ethanol. To the resulting solution was added 5 g. of a 5% palladium-on-carbon catalyst, followed by 51.6 g. of hydrazine hydrate. The reaction mixture was heated, allowed to reflux for three hours, cooled, filtered and evaporated to yield 188 g. of a clear resin product. The product was analyzed for amine equivalents (2.32 meq./g.) and for residual acidity (0.02 meq.H+/g.). The resin product was an oligomeric di-(p-aminobenzoate) ester of polytetramethylene oxide diol, the product being represented by the following structure:

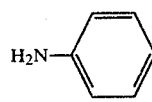

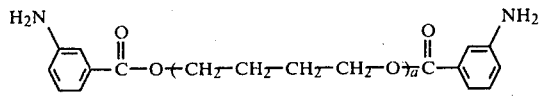

(3,5-diaminobenzoate) ester of polytetramethylene oxide diol, the product being represented by the following structure:

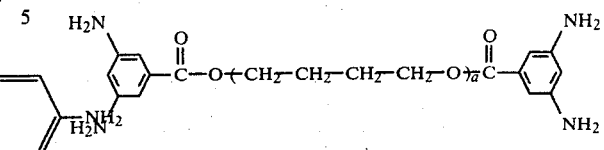

EXAMPLE IV

This Example illustrates the preparation of an oligomeric di-(m-aminobenzoate)ester of a polytetramethylene oxide diol. A reaction mixture was prepared by addition to 500 cc. of toluene of the following ingredients: 103 g. of a polytetramethylene oxide diol having a molecular weight of about 1000, (available as Polymeg 1000, from The Quaker Oats Company, Chicago, Ill.); 103 g. of m-nitrobenzoyl chloride; and 60.3 g. of triethylamine. The reaction mixture was heated and allowed to reflux overnight. The reaction mixture was cooled, filtered, washed with an aqueous (5% by weight) solution of sodium carbonate and evaporated to yield a yellow resin.

The yellow resin, as recovered above, was dissolved in one liter of ethanol. To the resulting solution was added 5 g. of a 5% palladium-on-carbon catalyst, followed by 31.2 g. of hydrazine hydrate. The reaction mixture was heated, allowed to reflux for three hours, cooled, filtered and evaporated to yield 243.8 g. of a clear resin product. The product was analyzed for amine equivalents (1.55 meq./g.) and for residual acidity (0.03 meq.H+/g.). The resin product was an oligomeric di-(m-aminobenzoate) ester of polytetramethylene oxide diol, the product being represented by the following structure:

EXAMPLE V

This example illustrates the preparation of an oligomeric di-(3,5-diaminobenzoate) ester of a polytetramethylene oxide diol. A reaction mixture was prepared by addition to 500 cc. of toluene of the following ingredients: 246.3 g. of a polytetramethylene oxide diol having a molecular weight of about 1000 (available as Polymeg 1000, from the Quaker Oats Company, Chicago, Ill.); 125 g. of 3,5-dinitrobenzoyl chloride; and 55.6 g. of triethylamine. The reaction mixture was heated and allowed to reflux overnight. The reaction mixture was cooled and 500 cc. of cyclohexane were added. Following filtration, the solution was evaporated to yield 230 g. of a dark resin.

The dark resin, as recovered above, was dissolved in one liter of isopropanol. To the resulting solution was added 5 g. of a 5% palladium-on-carbon catalyst, followed by 56 g. of hydrazine hydrate. The reaction mixture was heated, allowed to reflux for three hours, cooled, filtered, and evaporated to yield 160 g. of a resin product. The product was analyzed for amine equivalents (4.1 meq./g.) and for residual acidity (0.01 meq.H+/g.). The resin product was an oligomeric di-

EXAMPLE VI

This example illustrates the production by the polyaddition process of a cast elastomer utilizing oligomeric di-(p-aminobenzoate) ester of polytetramethylene oxide diol and a liquid polyisocyanate. A reaction mixture was prepared by mixing the following ingredients: 66 g. of an oligomeric di-(p-aminobenzoate) ester of polytetramethylene oxide diol, prepared utilizing the procedure set forth in Example I and having an amine equivalent value of 588 g./eq.; and 15.7 g. of a liquid polyisocyanate having an isocyanate equivalents value of 132.7 g./eq. and comprising MDI and polymeric MDI (available as PaPI 901 from the Upjohn Company, Kalamazoo, Mich.). The resulting mixture, which exhibited a pot life of seven minutes, was poured into a mold which had been pre-heated to a temperature of 110° C. and was retained in the mold at this temperature for one-half hour. A firm and non-cheesy elastomeric material was then demolded and maintained at a temperature of 110° C. overnight and was aged for one week at room temperature and 50% relative humidity. The following table sets forth properties of the resulting polymers.

TABLE 1

| | |
|---|---|
| Shore A Hardness (ASTM D2240-75) | 92 |
| Elongation at Break (ASTM D412-68) | 303% |
| 100% Modulus (ASTM D412-68) | 1071 p.s.i. |
| 300% Modulus (ASTM D412-68) | 2689 p.s.i. |
| Tensile Strength (ASTM D412-68) | 2831 p.s.i. |
| Split Tear (ASTM D624-73) | 43/61 p.l.i. |
| Bashore Rebound (ASTM D2632-75) | 43 |

EXAMPLE VII

This example illustrates the production by the polyaddition process of a liquid-cast elastomer utilizing a liquid polyisocyanate and an admixture of oligomeric di-(p-aminobenzoate) and di-(3,5-diaminobenzoate) esters of polytetramethylene oxide diol. A mixture of 64.6 g. of the di-(p-aminobenzoate) ester of polytetramethylene oxide diol, prepared as described in Example I and having an amine equivalent value of 588 g./eq., and 1.4 g. of a di-(3,5-diaminobenzoate)ester of polytetramethylene oxide diol, prepared as described in Example V and having an amine equivalent value of 244 g./eq., was prepared and degassed with nitrogen. The degassed mixture was then mixed with 17 g. of a liquid polyisocyanate comprising MDI and a trifunctional cycloadduct thereof (available as Isonate 143L from The Upjohn Company, Kalamazoo, Mich.). The resulting mixture, which exhibited a pot life of five minutes, was poured into a mold which had been pre-heated to a temperature of 110° C. After 15 minutes, a firm and non-cheesy elastomer was demolded and maintained overnight at a temperature of 100° C. After a one-week aging period, at room temperature and 50% relative humidity, the elastomer exhibited the following physical properties, set forth in Table 2.

TABLE 2

| | |
|---|---|
| Shore A Hardness (ASTM D2240-75) | 92 |
| Elongation at Break (ASTM D412-68) | 400% |
| 100% Modulus (ASTM D412-68) | 1284 p.s.i. |
| 300% Modulus (ASTM D412-68) | 2157 p.s.i. |
| Tensile Strength (ASTM D412-68) | 3973 p.s.i. |
| Split Tear (ASTM D624-73) | 60/110 p.l.i. |
| Bashore Rebound (ASTM D2632-75) | 50 |

EXAMPLE VIII

This example illustrates the production by the polyaddition process of a cast elastomer utilizing MDI and an oligomeric di(p-aminobenzoate) ester of polytetramethylene oxide diol. An oligomeric di(p-aminobenzoate) ester of polytetramethylene oxide diol, (66 g. of the product prepared as described in Example I) was heated to a temperature of 50° C. and mixed with 14.4 g. of MDI (available as Mondur M from Mobay Chemical Corporation, Pittsburgh, Pa.) which had been heated to a temperature of 50° C. The resulting mixture, which exhibited a pot life of four minutes, was poured into a mold which had been pre-heated to 100° C. After one-half hour, a firm and non-cheesy elastomeric piece was demolded and was maintained overnight at a temperature of 100° C. The elastomeric piece was aged for one week at 50% relative humidity and at room temperature and exhibited the following properties, set forth in Table 3.

TABLE 3

| | |
|---|---|
| Shore A Hardness (ASTM D2240-75) | 92 |
| Elongation at Break (ASTM D412-68) | 630% |
| 100% Modulus (ASTM D412-68) | 1058 p.s.i. |
| 300% Modulus (ASTM D412-68) | 1235 p.s.i. |
| Tensile Strength (ASTM D412-68) | 3100 p.s.i. |
| Split Tear (ASTM D624-73) | 1724 p.l.i. |
| Bashore Rebound (ASTM D2632-75) | 50 |

EXAMPLE IX

This example illustrates the production by the polyaddition process of a cast elastomer utilizing a liquid polyisocyanate and an oligomeric tri-(p-aminobenzoate) ester of a polypropylene oxide triol. An amount of 70 g. of a tri(p-aminobenzoate) ester of polypropylene oxide triol, prepared as described in Example II herein, was mixed at room temperature with 6.2 g. of a liquid polyisocyanate comprising MDI and a tri-functional cycloadduct thereof (available as Isonate 143L from The Upjohn Company, Kalamazoo, Mich.). The resulting mixture, which exhibited a pot life of ten minutes, was poured into a mold which had been pre-heated to a temperature of 135° C. and was retained in the mold at this temperature for 16 hours. The elastomer, a firm and non-cheesy piece, was then demolded and aged for one week at room temperature and 50% relative humidity. The following physical properties, set forth in Table 4, were obtained:

TABLE 4

| | |
|---|---|
| Shore A Hardness (ASTM D2240-75) | 35 |

TABLE 4-continued

| | |
|---|---|
| Elongation at Break (ASTM D412-68) | 480% |
| 100% Modulus (ASTM D412-68) | 76 p.s.i. |
| 300% Modulus (ASTM D412-68) | 160 p.s.i. |
| Tensile Strength (ASTM D412-68) | 320 p.s.i. |
| Split Tear (ASTM D624-73) | 69 p.l.i. |
| Bashore Rebound (ASTM D2632-75) | 38 |

EXAMPLE X

This example illustrates the production by the polyaddition process of a liquid-cast elastomer utilizing a liquid polyisocyanate and an admixture of oligomeric di-(p-aminobenzoate) and di-(m-aminobenzoate) esters of polytetramethylene oxide diol. A mixture of 52.8 g. of the di-(p-aminobenzoate) ester of polytetramethylene oxide diol prepared as described in Example I, and 13 g. of the di(m-aminobenzoate) ester of polytetramethylene oxide diol, prepared as described in Example IV, was prepared and degassed with nitrogen. The degassed mixture was then mixed at room temperature with 15.4 g. of a liquid polyisocyanate comprising MDI and a tri-functional cycloadduct thereof (available as Isonate 143L from the Upjohn Company, Kalamazoo, Mich.). The resulting mixture, which exhibited a pot life of eight minutes, was poured into a mold which had been pre-heated to a temperature of 110° C. After 15 minutes, the resulting firm and non-cheesy elastomer was demolded and maintained overnight at a temperature of 110° C. After a one-week aging period, at room temperature and 50% relative humidity, the elastomer exhibited the following physical properties, set forth in Table 5.

TABLE 5

| | |
|---|---|
| Shore A Hardness (ASTM D2240-75) | 92 |
| Elongation at Break (ASTM D412-68) | 596% |
| 100% Modulus (ASTM D412-68) | 1260 p.s.i. |
| 300% Modulus (ASTM D412-68) | 1600 p.s.i. |
| Tensile Strength (ASTM D412-68) | 7975 p.s.i. |
| Split Tear (ASTM D624-73) | 166/308 p.l.i. |
| Bashore Rebound (ASTM D2632-75) | 50 |

EXAMPLE XI

This example illustrates the production by the polyaddition process of a liquid-cast elastomer utilizing a liquid polyisocyanate and an admixture of oligomeric di(p-aminobenzoate) esters of polytetramethylene oxide diols. A mixture of 60.3 g. of the oligomeric di-(p-aminobenzoate) ester of Polymeg 1000, prepared as set forth in Example I, and 10.1 g. of the oligomeric di-(p-aminobenzoate) ester of Polymeg 650, prepared as set forth in Example III, was degassed with nitrogen gas. The degassed mixture was then mixed with 17.7 g. of a liquid polyisocyanate comprising MDI and a tri-functional cycloadduct thereof (available as Isonate 143L from The Upjohn Company, Kalamazoo, Mich.). The resulting mixture, which exhibited a pot life of nine minutes, was poured into a mold which had been pre-heated to a temperature of 110° C. After one-half hour, the resulting firm and non-cheesy elastomer was demolded and maintained overnight at a temperature of 110° C. After a one-week aging period, at room temperature and 50% relative humidity, the elastomer exhibited the following physical properties, set forth in Table 6.

TABLE 6

| | |
|---|---|
| Shore A Hardness (ASTM D2240-75) | 95 |
| Elongation at Break (ASTM D412-68) | 570% |
| 100% Modulus (ASTM D412-68) | 1510 p.s.i. |
| 300% Modulus (ASTM D412-68) | 2043 p.s.i. |
| Tensile Strength (ASTM D412-68) | 8090 p.s.i. |
| Split Tear (ASTM D624-73) | 257/384 p.l.i. |
| Bashore Rebound (ASTM D2632-75) | 55 |

EXAMPLE XII

An oligomeric di-(ortho-aminobenzoate) ester of polytetramethylene oxide diol was prepared in the following manner.

A suspension of 3.0 g of powdered sodium hydroxide in 250.1 g. (0.25 mole) of a polytetramethylene oxide diol having a molecular weight of about 1000 (Teracol 1000, available from E.I. DuPont de Nemours and Company, Wilmington, Del.) was heated to 90° C. and 130 g. (0.80 mole) of isatoic anhydride added gradually over five hours at 30-minute intervals. The reaction was completed by heating to 130° C. for 15 minutes and was cooled to 35° C. Methylene chloride (250 ml.) was added to the reaction solution and the solution was filtered. The filtrate was washed with 500 ml. of deionized water (saturated with carbon dioxide) to remove residual sodium hydroxide. The reaction mixture was extracted three times, each with a 500-ml. quantity of deionized water. Methylene chloride solvent was removed from the reaction product under vacuum, yielding an amber-yellow viscous liquid product.

Analysis of the products indicated an amine equivalent of 1.45 milliequivalents per gram of product (meq./g.). Infrared spectral analysis confirmed the structure of the oligomeric product, represented by the following formula:

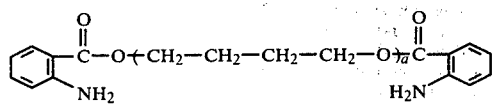

EXAMPLE XIII

This example illustrates the production by the polyaddition process of a cast elastomer utilizing MDI and an oligomeric di(p-aminobenzoate) ester of polytetramethylene oxide diol. Fifty grams (0.07 equivalent) of an oligomeric di(p-aminobenzoate) ester of polytetramethylene oxide diol (prepared substantially as described in Example I) was heated to a temperature of 50° C. and mixed with 8.8 g. of MDI (available as Mondur M from Mobay Chemical Corporation, Pittsburgh, Pa.) which had been heated to a temperature of 50° C. The resulting mixture, which exhibited a pot life of seven minutes, was poured into a mold which had been pre-heated to 110° C. The mold was then placed under a pressure of 2000 p.s.i. for one hour at a temperature of 110° C. The mold was placed into an aging oven for 18 hours at a temperature of 110° C. and the mold was disassembled. The resulting elastomeric piece, firm and non-cheesy, was aged for one week at 50% relative humidity and at room temperature and exhibited the following properties, set forth in Table 7.

TABLE 7

| | |
|---|---|
| Shore A Hardness (ASTM D2240-75) | 92 |
| Elongation at Break (ASTM D412-68) | 543% |

TABLE 7-continued

| | |
|---|---|
| 100% Modulus (ASTM D412-68) | 1307 p.s.i. |
| 300% Modulus (ASTM D412-68) | 1924 p.s.i. |
| Tensile Strength (ASTM D412-68) | 9249 p.s.i. |
| Compression Set (ASTM D395-65, Method B) | 69% |
| Bashore Rebound (ASTM D2632-75) | 59 |
| Split Tear Maximum | 568 p.l.i. |

EXAMPLE XIV

For purposes of comparison with the elastomeric material prepared as described in EXAMPLE XIII, a polymeric material was prepared utilizing an oligomeric di(o-aminobenzoate) ester of a polytetramethylene oxide diol as follows. Fifty grams (0.07 equivalent) of di(o-aminobenzoate) ester of polytetramethylene oxide diol (the diester prepared in EXAMPLE XII herein) was heated to a temperature of 50° C. and mixed with 8.8 g. (0.07 equivalent) of MDI (Mondur M from Mobay Chemical Corporation, Pittsburgh, Pa.) which had been heated to a temperature of 50° C. The resulting mixture, which exhibited a pot life of seven minutes, was poured into a mold which had been pre-heated to 110° C. The mold was then placed under a pressure of 2000 p.s.i. for one hour at a temperature of 110° C. The mold was placed into an aging oven for 18 hours at a temperature of 110° C. and the mold was disassembled. The resulting product could not be demolded as a single sheet owing to the soft and gummy nature of the material. Examination of the resulting product after several hours at ambient temperature, showed the polymeric material to flow in the nature of a viscous liquid. Even after a few days, the casting had not hardened and remained soft and sticky. The product had a Shore A Hardness of 5. The remaining properties outlined in Table 7 could not be measured.

From the preceding results, it will be appreciated that the product of this Example, based upon the utilization of an oligomeric di(ortho-aminobenzoate) ester of tetramethylene oxide diol, exhibited inferior physical properties relative to the elastomeric material of EXAMPLE XIII, based upon the utilization of an oligomeric di(para-aminobenzoate) ester of tetramethylene oxide diol.

EXAMPLE XV

This example illustrates the production by the polyaddition process of polymeric materials utilizing a liquid polyisocyanate and an oligomeric di(aminobenzoate) ester of a polytetramethylene oxide diol. In one case (Polymer XV A), the oligomeric di(aminobenzoate) ester of polytetramethylene oxide diol was the di(p-aminobenzoate) ester utilized in EXAMPLE XIII. In the case of the production of Polymer XV B, the oligomeric di(aminobenzoate) ester was the di(o-aminobenzoate) ester of EXAMPLE XII. The polymeric materials were prepared in the following manner. A reaction mixture was prepared in each case by mixing the following ingredients: 50 g. (0.07 equivalent) of the appropriate oligomeric di-(aminobenzoate) ester of polytetramethylene oxide diol; and 9.3 g. (0.07 equivalent) of a liquid polyisocyanate comprising MDI and polymeric MDI (available as PaPI 901 from The Upjohn Company, Kalamazoo, Mich.). The resulting mixture was in each case poured into a mold which had been preheated to a temperature of 110° C. and was retained in the mold at this temperature for one hour. The resulting polymeric material was then in each case demolded, maintained at a temperature of 110° C. overnight and aged for one week at room temperature and 50% relative humidity. The following table (Table 8) sets forth the results of the physical properties of the resulting polymers.

TABLE 8

|  | Polymer XV A | Polymer XV B |
|---|---|---|
| Shore A Hardness (ASTM D2240-75) | 87 | 50 |
| Elongation at Break (ASTM D412-68) | 300% | 398% |
| 100% Modulus (ASTM D412-68) | 1204 p.s.i. | 120 p.s.i. |
| 300% Modulus (ASTM D412-68) | 4415 p.s.i. | 245 p.s.i. |
| Tensile Strength (ASTM D412-68) | 4415 p.s.i. | 476 p.s.i. |
| Split Tear, Initial/Average (ASTM D624-73) | 60.2/62.3 p.l.i. | 15.8/20.7 p.l.i. |
| Compression Set (ASTM D395-65, Method B) | 66 | 25 |
| Bashore Rebound (ASTM D2632-75) | 52 | 14 |

From inspection of the data set forth in Table 8, it will be seen that the physical properties of Polymer XV B, based upon utilization of the ortho- isomeric oligomer, were inferior to those of Polymer XV A, based upon utilization of the para- isomeric oligomer, i.e., the di-(p-benzoate) ester of polytetramethylene oxide diol.

EXAMPLE XVI

For purposes of evaluating the thermal stability of an elastomer prepared from an oligomeric di-(or-thoaminobenzoate ester of a polyalkylene ether glycol, the following was conducted. Fifty grams (0.07 equivalent) of the di-(o-aminobenzoate) ester of polytetramethylene oxide diol (the product of Example XII) and 9.3 g. (0.07 equivalent) of a liquid polyisocyanate comprising MDI and polymeric MDI (PaPI 901 from the Upjohn Company, Kalamazoo, Mich.) were mixed and poured into a mold at room temperature. The mold was then placed under 2000 p.s.i. pressure overnight at room temperature. The following day, the polymeric material was demolded and cut in half along a diagonal. One half of the polymeric material (Polymer XVI-R.T.) was aged for one week at room temperature (R.T.) and 50% relative humidity. The second half (Polymer XVI-110° C.) was heated to a temperature of 110° C. overnight and was then aged at room temperature and 50% relative humidity for the remainder of one-week period. Physical properties of the two polymeric materials subjected to the respective heat histories aforedescribed, were measured and are reported as follows in Table 9.

TABLE 9

|  | Polymer XV A | Polymer XV B |
|---|---|---|
| Shore A Hardness (ASTM D2240-75) | 65 | 60 |
| Elongation at Break (ASTM D412-68) | 383% | 360% |
| 100% Modulus (ASTM D412-68) | 197 p.s.i. | 74 p.s.i. |
| 300% Modulus (ASTM D412-68) | 555 p.s.i. | 155 p.s.i. |
| Tensile Strength (ASTM D412-68) | 1428 p.s.i. | 219 p.s.i. |
| Compression Set (ASTM D395-69, Method B) | 24 | 34 |
| Bashore Rebound (ASTM D2632-75) | 31 | 22 |

From the results reported in Table 9, it will be seen that the physical properties of the polymer prepared from the di(o-aminobenzoate) ester of polytetramethylene oxide diol showed appreciable deterioration (Polymer XVI-110° C.) as the result of subjection to heat relative to the same polymeric material aged only at room temperature (Polymer XVI-R.T.). It will also be noted from a comparison of the physical properties of the polymeric material of Example XV (Polymer XV A), prepared from an oligomeric di(p-aminobenzoate) ester of polytetramethylene oxide diol and aged at 110° C., that the physical properties of Polymer XV A were superior to those of polymer XVI-110° C.

What is claimed is:

1. A synthetic polymer substantially free of the reaction product of an isocyanate and a polyalkylene ether glycol or polyol and substantially free of salts formed during production of the polymer by reaction of a basic material and an amine salt and comprising the reaction product of a polyisocyanate and substantially an equivalent amount of an oligomeric aminobenzoic acid ester or amide having the formula

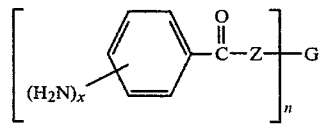

wherein n is an integer from 2 to 4; each x is one or two; each benzoyl nucleus is para-, meta- or di-metaamino-substituted; each Z is

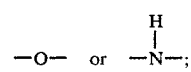

and G is an n- valent radical obtained by removal of hydroxy groups or amino groups from an n-valent polyol or polyamine having a molecular weight of from about 400 to about 6,000.

2. The synthetic polymer of claim 1 wherein said polyisocyanate comprises from about 0.9 to about 1.2 equivalents per equivalent of said oligomeric aminobenzoic acid ester or amide.

3. The synthetic polymer of claim 2 wherein said polyisocyanate comprises from about 1.0 to about 1.15 equivalents per equivalent of said oligomeric aminobenzoic acid ester or amide.

4. The synthetic polymer of claim 1 wherein said oligomeric aminobenzoic acid or amide has the formula

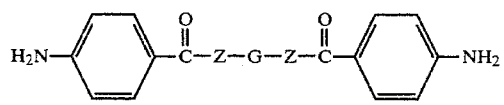

wherein G represents a divalent radical obtained by the removal of two hydroxyl or amino groups from an oligomeric polyol or polyamine having a molecular weight in the range of about 400 to about 6,000.

5. The synthetic polymer of claim 4 wherein said molecular weight is in the range of from about 650 to about 2,000.

6. the synthetic polymer of claim 4 wherein each said Z is —O— and said divalent radical G is obtained by removal of two hydroxyl groups from a polyalkyleneether glycol wherein the alkylene moiety thereof has up to ten carbon atoms.

7. The synthetic polymer of claim 6 wherein said alkylene moiety of said polyalkyleneether glycol has from two to four carbon atoms.

8. The synthetic polymer of claim 7 wherein said alkylene moiety is from polytetramethylene ether glycol having a molecular weight of about 1000.

9. The synthetic polymer of claim 1 in the form of a cast elastomer.

10. The synthetic polymer of claim 8 in the form of a cast elastomer.

11. The synthetic polymer of claim 1 in the form of a cellular foam.

12. The synthetic polymer of claim 8 in the form of a cellular foam.

13. The synthetic polymer of claim 1 wherein said oligomeric aminobenzoic acid ester or amide has the formula

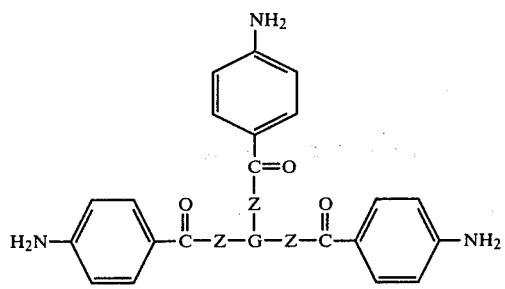

wherein G represents a trivalent radical obtained by the removal of three hydroxyl or amino groups from an oligomeric polyol or polyamine having a molecular weight in the range of from about 400 to about 6,000.

14. The synthetic polymer of claim 13 wherein said molecular weight is in the range of from about 650 to about 2,000.

15. The synthetic polymer of claim 13 wherein each said Z is —O— and said trivalent radical G is obtained by removal of three hydroxyl groups from a polyoxyalkyleneether glycerol.

16. The synthetic polymer of claim 15 wherein said alkylene moiety of said polyoxyalkyleneether glycol has from two to four carbon atoms.

17. The synthetic polymer of claim 16 wherein said alkylene moiety is from polytetramethylene ether glycol having a molecular weight of about 1000.

18. The synthetic polymer of claim 17 in the form of a cast elastomer.

19. The synthetic polymer of claim 17 in the form of a cellular foam.

20. The synthetic polymer of claim 1 wherein said polyisocyanate comprises a liquid polyisocyanate.

21. The synthetic polymer of claim 20 wherein said liquid polyisocyanate includes 4,4'-diphenylmethane diisocyanate.

22. The synthetic polymer of claim 20 wherein said liquid polyisocyanate includes a polymeric polyisocyanate having from about 4 to about 15 isocyanate groups per molecule.

23. The synthetic polymer of claim 1 which comprises the reaction product of a polyisocyanate and substantially an equivalent amount of a mixture of oligomeric aminobenzoic acid esters, said mixture comprising a di-(4-aminobenzoate) ester having the formula

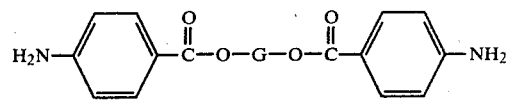

wherein G represents a divalent radical obtained by the removal of two hydroxyl groups from an oligomeric polyol having a molecular weight in the range of about 400 to about 6,000; and from about 1% to about 50% by weight of said di-(4-aminobenzoate) ester, of a di-(3-aminobenzoate) ester having the formula

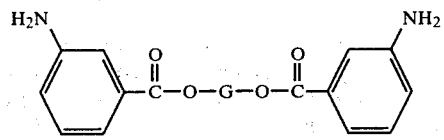

wherein G represents a divalent radical obtained by the removal of two hydroxyl groups from an oligomeric polyol having a molecular weight in the range of from about 400 to about 6,000.

24. The synthetic polymer of claim 23 wherein each said G is a divalent radical obtained by the removal of two hydroxyl groups from an oligomeric polyol having a molecular weight in the range of from about 650 to about 2,000.

25. The synthetic polymer of claim 23 wherein each said G is a divalent radical obtained by the removal of two hydroxyl groups from a polyoxyalkyleneether glycol.

26. The synthetic polymer of claim 1 which comprises the reaction product of a polyisocyanate and substantially an equivalent amount of a mixture of oligomeric aminobenzoic acid esters, said mixture comprising a di-(4-aminobenzoate)ester having the formula

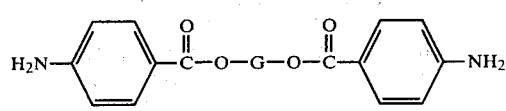

wherein G represents a divalent radical obtained by the removal of two hydroxyl groups from an oligomeric polyol having a molecular weight in the range of from about 400 to about 6,000; and from about 1% to about 15% by weight of said di-(4-aminobenzoate) ester, of a di-(3,5-diaminobenzoate) ester having the formula

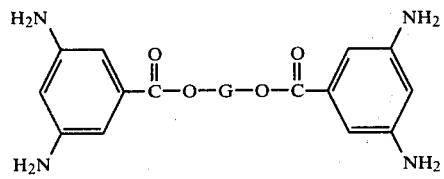

wherein G represents a divalent radical obtained by the removal of two hydroxyl groups from an oligomeric polyol having a molecular weight in the range of from about 400 to about 6,000.

27. The synthetic polymer of claim 26 wherein each said G is a divalent radical obtained by the removal of two hydroxyl groups from an oligomeric polyol having a molecular weight in the range of from about 650 to about 2,000.

28. The synthetic polymer of claim 26 wherein each said G is a divalent radical obtained by the removal of two hydroxyl groups from a polyalkyleneether glycol.

29. The synthetic polymer of claim 1 which comprises the reaction product of a polyisocyanate and substantially an equivalent amount of a mixture of oligomeric p-aminobenzoic acid esters, said mixture comprising a di-(p-aminobenzoate) ester having the formula

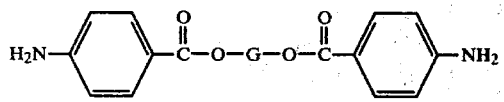

wherein G represents a divalent radical obtained by the removal of two hydroxyl groups from an oligomeric polyol having a molecular weight in the range of about 400 to about 6,000; and from about 1% to about 20% by weight of said di-(p-aminobenzoate) ester, of a tri-(p-aminobenzoate) ester having the formula

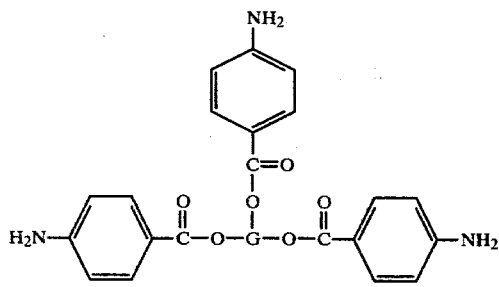

wherein G represents a trivalent radical obtained by the removal of three hydroxyl groups from an oligomeric polyol having a molecular weight in the range of from about 400 to about 6,000.

30. A process for preparing a synthetic polymer from a reaction mixture substantially free of polyalkylene ether glycols or polyols and acidic reaction rate-controlling amine salt-forming agents, said process comprising reacting a polyisocyanate with substantially an equivalent amount of an oligomeric p-aminobenzoic acid or amide having the formula

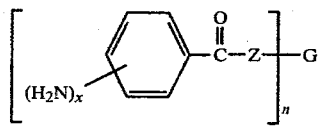

wherein n is an integer 2 to 4; each x is one or two; each benzoyl nucleus is para-, meta-, or di-meta- amino-substituted; each Z is

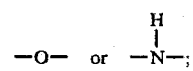

and G is an n-valent radical obtained by removal of hydroxyl groups or amino groups from an n-valent polyol or polyamine having a molecular weight of from about 400 to about 6,000.

31. The process of claim 30 wherein said polyisocyanate comprises from about 0.9 to about 1.2 equivalents per equivalent of said oligomeric aminobenzoic acid ester of amide.

32. The process of claim 31 wherein said polyisocyanate comprises from about 1.0 to about 1.15 equivalents per equivalent of said oligomeric aminobenzoic acid ester or amide.

33. The process of claim 31 wherein said oligomeric aminobenzoic acid ester or amide has the formula

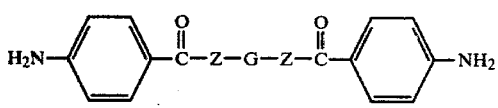

wherein G represents a divalent radical obtained by the removal of two hydroxyl or amino groups from an oligomeric polyol or polyamine having a molecular weight in the range of about 400 to about 6,000.

34. The process of claim 33 wherein said molecular weight is in the range of from about 650 to about 2,000.

35. The process of claim 33 wherein each said Z is —O— and said divalent radical G is obtained by removal of two hydroxyl groups from a polyalkyleneether glycol wherein the alkylene moiety thereof has up to ten carbon atoms.

36. The process of claim 35 wherein said alkylene moiety of said polyalkyleneether glycol has from two to four carbon atoms.

37. The process of claim 36 wherein said alkylene moiety is from polytetramethylene ether glycol having a molecular weight of about 1000.

38. The process of claim 30 wherein said reaction mixture includes a blowing agent.

39. The process of claim 30 wherein said oligomeric aminobenzoic acid ester or amide has the formula

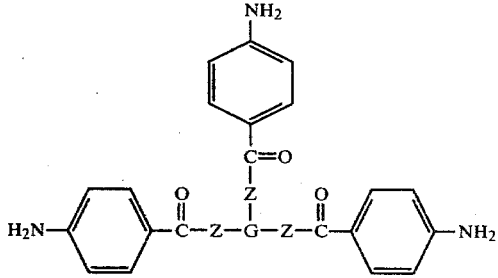

wherein G represents a trivalent radical obtained by the removal of three hydroxyl or amino groups from an oligomeric polyol or polyamine having a molecular weight in the range of from about 400 to about 6,000.

40. The process of claim 39 wherein each said Z is —O— and said trivalent radical G is obtained by removal of three hydroxyl groups from a polyoxyalkyleneether glycerol.

41. The process of claim 40 wherein said alkylene moiety of said polyoxyalkyleneether glycol has from two or four carbon atoms.

42. The process of claim 41 wherein each said alkylene moiety is from polytetramethylene ether glycol having a molecular weight of about 1000.

43. The process of claim 42 wherein said reaction mixture includes a blowing agent.

44. The process of claim 30 wherein said polyisocyanate comprises a liquid polyisocyanate.

45. The process of claim 44 wherein said polyisocyanate comprises 4,4'-diphenylmethane diisocyanate.

46. The process of claim 44 wherein said liquid polyisocyanate comprises a polymeric polyisocyanate having from about 4 to about 15 isocyanate groups per molecule.

47. The process of claim 30 which comprises reacting said polyisocyanate with substantially an equivalent amount of a mixture of oligomeric aminobenzoic acid esters, said mixture comprising a di-(4-aminobenzoate) ester having the formula

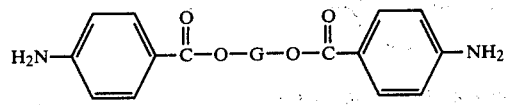

wherein G represents a divalent radical obtained by the removal of two hydroxyl groups from an oligomeric polyol having a molecular weight in the range of about 400 to about 6,000; and from about 1% to about 50% by weight of said di-(4-aminobenzoate ester), of a di-(3-aminobenzoate) ester having the formula

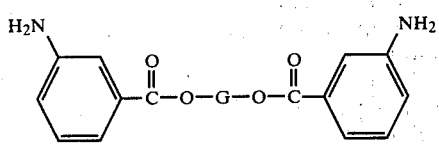

wherein G represents a divalent radical obtained by the removal of two hydroxyl groups from an oligomeric polyol having a molecular weight in the range of from about 400 to about 6,000.

48. The process of claim 47 wherein each said G is a divalent radical obtained by the removal of two hydroxyl groups from an oligomeric polyol having a molecular weight in the range of from about 650 to about 2,000.

49. The process of claim 47 wherein each said G is a divalent radical obtained by the removal of two hydroxyl groups from a polyoxyalkyleneether glycol.

50. The process of claim 30 which comprises reacting said polyisocyanate with substantially an equivalent amount of a mixture of oligomeric aminobenzoic acid esters, said mixture comprising a di-(4-aminobenzoate) ester having the formula

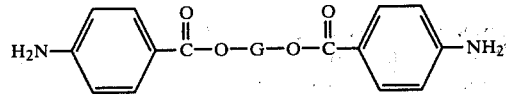

wherein G represents a divalent radical obtained by the removal of two hydroxyl groups from an oligomeric polyol having a molecular weight in the range of from about 400 to about 6,000; and from about 1% to about 15% by weight of said di-(4-aminobenzoate) ester, of a di-(3,5-diaminobenzoate) ester having the formula

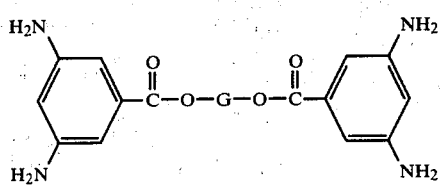

wherein G represents a divalent radical obtained by the removal of two hydroxyl groups from an oligomeric polyol having a molecular weight in the range of from about 400 to about 6,000.

51. The process of claim 50 wherein each said G is a divalent radical obtained by the removal of two hydroxyl groups from an oligomeric polyol having a molecular weight in the range of from about 650 to about 2,000.

52. The process of claim 50 wherein each said G is a divalent radical obtained by the removal of two hydroxyl groups from a polyalkyleneether glycol.

53. The process of claim 30 wherein said oligomeric aminobenzoic acid ester comprises a mixture of a di-(p-aminobenzoate) ester having the formula

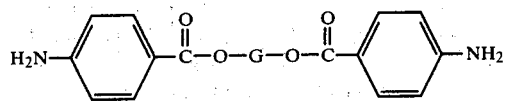

wherein G represents a divalent radical obtained by the removal of two hydroxyl groups from an oligomeric polyol having a molecular weight in the range of about 400 to about 6,000; and from about 1% to about 20% by weight of said di-(aminobenzoate) ester, of a tri-(aminobenzoate) ester having the formula

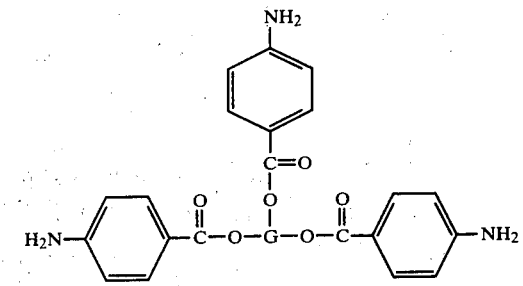

wherein G represents a trivalent radical obtained by the removal of three hydroxyl groups from an oligomeric polyol having a molecular weight in the range of from about 400 to about 6,000.

54. A synthetic polymer which consists essentially of the reaction product of a polyisocyanate and substantially an equivalent amount of an oligomeric aminobenzoic acid ester or amide having the formula

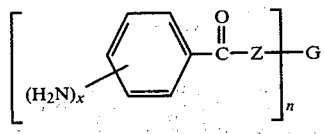

wherein n is an integer from 2 to 4; each x is one or two; each benzoyl nucleus is para-, meta- or di-meta- amino-substituted; each Z is

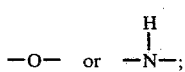

and G is an n-valent radical obtained by removal of hydroxy groups or amino groups from an n-valent polyol or polyamine having a molecular weight of from about 400 to about 6,000.

55. The synthetic polymer of claim 1 wherein said polyisocyanate comprises from about 0.9 to about 1.2 equivalents per equivalent of said oligomeric aminobenzoic acid ester or amide.

56. The synthetic polymer of claim 54 wherein said polyisocyanate comprises from about 1.0 to about 1.15 equivalents per equivalent of said oligomeric aminobenzoic acid ester or amide.

57. The synthetic polymer of claim 54 wherein said oligomeric aminobenzoic acid ester or amide has the formula

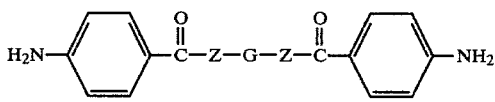

wherein G represents a divalent radical obtained by the removal of two hydroxyl or amino groups from an oligomeric polyol or polyamine having a molecular weight in the range of about 400 to about 6,000.

58. The synthetic polymer of claim 57 wherein said molecular weight is in the range of from about 650 to about 2,000.

59. The synthetic polymer of claim 57 wherein each said Z is —O— and said divalent radical G is obtained by removal of two hydroxyl groups from a polyalkyleneether glycol wherein the alkylene moiety thereof has up to ten carbon atoms.

60. The synthetic polymer of claim 59 wherein said alkylene moiety of said polyalkyleneether glycol has from two to four carbon atoms.

61. The synthetic polymer of claim 60 wherein said alkylene moiety is from polytetramethylene ether glycol having a molecular weight of about 1000.

62. The synthetic polymer of claim 54 in the form of a cast elastomer.

63. The synthetic polymer of claim 54 in the form of a cellular foam.

64. A process for preparing a synthetic polymer which comprises reacting a mixture which consists essentially of a polyisocyanate and substantially an equivalent amount of an oligomeric aminobenzoic acid or amide having the formula

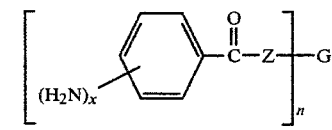

wherein n is an integer from 2 to 4; each x is one or two; each benzoyl nucleus is para-, meta- or di-meta- aminosubstituted; each Z is

and G is an n-valent radical obtained by removal of hydroxy groups or amino groups from an n-valent polyol or polyamine having a molecular weight of from about 400 to about 6,000.

65. The process of claim 64 wherein said polyisocyanate comprises from about 0.9 to about 1.2 equivalents per equivalent of said oligomeric aminobenzoic acid ester or amide.

66. The process of claim 65 wherein said polyisocyanate comprises from about 1.0 to about 1.15 equivalents per equivalent of said oligomeric aminobenzoic acid ester or amide.

67. The process of claim 65 wherein said oligomeric aminobenzoic acid ester or amide has the formula

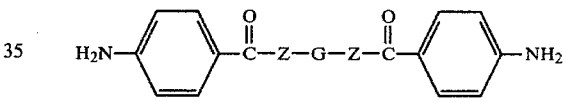

wherein G represents a divalent radical obtained by the removal of two hydroxyl or amino groups from an oligomeric polyol or polyamine having a molecular weight in the range of about 400 to about 6,000.

68. The process of claim 64 wherein said molecular weight is in the range of from about 650 to about 2,000.

69. The process of claim 64 wherein each said Z is —O— and said divalent radical G is obtained by removal of two hydroxyl groups from a polyalkyleneether glycol wherein the alkylene moiety thereof has up to ten carbon atoms.

70. The process of claim 69 wherein said alkylene moiety of said polyalkyleneether glycol has from two to four carbon atoms.

71. The process of claim 70 wherein said alkylene moiety is from polytetramethylene ether glycol having a molecular weight of about 1,000.

72. The process of claim 64 wherein said reaction mixture includes a blowing agent.

* * * * *